(12) United States Patent
Pasha et al.

(10) Patent No.: US 7,453,829 B2
(45) Date of Patent: Nov. 18, 2008

(54) METHOD FOR CONDUCTING A VIDEO CONFERENCE

(75) Inventors: Athar N. Pasha, Aloha, OR (US); Ryan P. Hegar, Clackamas, OR (US); Jon E. Erickson, Portland, OR (US)

(73) Assignee: Tut Systems, Inc., Horsham, PA (US)

( * ) Notice: Subject to any disclaimer, the term of this patent is extended or adjusted under 35 U.S.C. 154(b) by 1086 days.

(21) Appl. No.: 10/697,512

(22) Filed: Oct. 29, 2003

(65) Prior Publication Data

US 2005/0094578 A1     May 5, 2005

(51) Int. Cl.
    *H04L 12/16*     (2006.01)
(52) U.S. Cl. ............. 370/261; 370/395.53; 375/240.26; 709/230
(58) Field of Classification Search ................. 370/260, 370/261, 395.53; 375/240.26; 709/230
See application file for complete search history.

(56) References Cited

U.S. PATENT DOCUMENTS

| 7,039,116 B1 * | 5/2006 | Zhang et al. ........... 375/240.26 |
| 2002/0036990 A1 | 3/2002 | Chodor et al. |
| 2003/0235338 A1 | 12/2003 | Dye |
| 2004/0223464 A1 | 11/2004 | Dye et al. |

* cited by examiner

*Primary Examiner*—Gerald Gauthier
(74) *Attorney, Agent, or Firm*—Stewart M. Wiener

(57) ABSTRACT

A video conferencing terminal includes an encoder that receives a baseband audio signal and a baseband video signal and creates compressed audio packets and compressed audio-video packets. A network interface driver receives the compressed audio packets and the compressed audio-video packets, IP encapsulates the compressed audio packets and the compressed audio-video packets, transmits the IP packets onto an IGMP network. The network interface driver also requests audio packets and audio-video packets from the network and recovers compressed audio packets and compressed audio-video packets from the IP packets received from the network. A decoder receives compressed audio packets and compressed audio-video packets from the network interface driver and generates a baseband video signal and multiple baseband audio signals.

3 Claims, 3 Drawing Sheets

METHOD FOR CONDUCTING A VIDEO CONFERENCE

BACKGROUND OF THE INVENTION

This invention relates to apparatus for conducting a video conference and to a method of conducting a video conference.

Referring to FIG. 1 of the drawings, one typical implementation of video conferencing among several sites involves use of an A/V terminal T at each conference site and a single multi-point control unit, or MCU. The several conference sites are spatially separated to a greater or lesser degree and are all connected to a network. The MCU is also connected to the network. Although FIG. 1 shows the MCU at a different network site from the conference terminals, in practice the MCU might be at one of the conference sites and the terminal at that site might be connected to the network through the MCU.

Referring to FIG. 2, each A/V terminal includes a microphone 2, a loudspeaker 6, a camera 10, a monitor 14, an encoder/decoder (CODEC) 18/20, and a network interface driver 24. The microphone and camera acquire audio and video signals, which are then digitized, and the encoder 18 encodes the digital audio and video signals in accordance with appropriate compression protocols, such as MPEG 1 and MPEG 2, and outputs a standard audio-video MPEG transport stream (MTS). The network interface driver 24 receives the MPEG transport stream and creates audio-video IP packets {AV}, where the braces { } designate encapsulation of the MTS packets in IP packets. The IP packets that are derived from MTS packets are referred to herein as AV IP packets in order to distinguish them from other IP packets. Each AV IP packet typically contains seven MTS packets. The MCU sends requests for AV IP packets to the different terminals over the network. The terminals respond to the packet requests by sending the appropriate AV IP packets onto the network, and the network routes the AV IP packets to the MCU.

Referring to FIG. 3, the network interface driver 28 of the MCU receives the AV IP packets provided by the terminals T respectively and routes the four MPEG transport streams recovered from the AV IP packets to respective decoders $32_1$-$32_4$. Each decoder 32 decompresses the MPEG transport streams received from the corresponding terminals to generate a terminal video signal $V_{IN}$ and a terminal audio signal $A_{IN}$, which it supplies to an audio/video processor 36.

The A/V processor combines the input audio signals $A1_{IN}$-$A4_{IN}$ to generate output audio signals $A1_{OUT}$-$A4_{OUT}$ for the terminals T1-T4 respectively and routes the audio signals $A1_{OUT}$-$A4_{OUT}$ to the encoders $40_1$-$40_4$ respectively. Normally, the audio signal that is supplied to the loudspeaker 6 at a given conference site will reflect the audio signals acquired by the microphones 2 at all the other conference sites. The A/V processor may generate the output audio signals by first combining all the input audio signals to create a common mix signal and then subtracting the input audio signal received from a given terminal from the common mix signal to create a mix-minus audio output signal for the given terminal. Accordingly, the output audio signal for terminal T1, for example, is composed of the signals $A2_{IN}$-$A4_{IN}$ received from terminals T2, T3 and T4. In this manner, objectionable echo effects are reduced or avoided.

The A/V processor 36 creates output video signals $V1_{OUT}$-$V4_{OUT}$ for the terminals T1-T4 respectively. In one implementation, the output video signals are all the same and represent a common conference picture. In the case of there being four conference sites, the A/V processor 36 may combine the several terminal video signals $V1_{IN}$-$V4_{IN}$ to create a so-called quad split conference video signal, which represents a picture in which the four terminal pictures, represented by the four terminal video signals respectively, are displayed in respective quadrants of the conference picture. More generally, however, the output video signals may be different and depend on selections made at the respective sites. For example, the participant at site 1 (the location of terminal T1) might wish to view the picture acquired by the camera at site 3. In this case, the signal $A1_{OUT}$ is a combination of $A2_{IN}$-$A4_{IN}$ and the video signal $V1_{OUT}$ is the same as $V3_{IN}$.

Each of the encoders compresses the audio and video signals for the corresponding terminal and outputs a standard audio-video MPEG transport stream. The network interface driver of the terminal T1, for example, sends out requests for AV IP packets, and the network interface driver 28 of the MCU responds to a packet request by sending AV IP packets from the encoder $40_1$ onto the network, and the network routes the packets to terminal T1. The network interface driver 24 of the terminal T1 receives the AV IP packets from the network and supplies the corresponding MPEG transport stream to the decoder 20, which decompresses the MPEG transport stream to generate the video signal $V1_{OUT}$ and an audio signal derived from the signals $A2_{IN}$-$A4_{IN}$ received by the MCU from terminals T2, T3 and T4. The picture represented by the video signal $V1_{OUT}$ is displayed on the monitor 14 at the terminal T1 and the audio signal is played back through the speaker 6.

It will be appreciated from the foregoing brief description of one implementation of video conferencing that the conventional hub and spoke system requires that substantial audio and video processing be performed at the MCU. For example, in the case of the example that has just been discussed, it is necessary to synchronize the four terminal video signals at the MCU in order to combine the terminal video signals and it is also necessary to synchronize the terminal audio signals with the corresponding terminal video signals in order to preserve lip sync. Further, since the MCU processes the audio and video signals that are acquired at the different conference sites, the MCU must include a CODEC for each conference site. Thus, for each conference site there must be both a site CODEC in the terminal and a central CODEC in the MCU. Moreover, the network connection to the MCU must have sufficient bandwidth to accommodate all the terminal MPEG transport streams, which may place a practical limit on the number of conference participants.

In addition, the conventional implementation places control over the conference picture in the hands of whoever controls the MCU, which might not always be optimum.

Imperfections in echo cancellation might not allow the mix-minus technique described above in connection with FIG. 3 to produce an audio signal that provides a natural sound on playback.

SUMMARY OF THE INVENTION

In accordance with a first aspect of the invention there is provided a video conferencing terminal comprising an encoder means that receives a baseband audio signal and a baseband video signal and creates compressed audio packets and compressed audio-video packets, a network interface means that receives the compressed audio packets and the compressed audio-video packets from the encoder means, IP encapsulates the compressed audio packets and the compressed audio-video packets, transmits the IP packets onto an IGMP network, requests audio packets and audio-video packets from the network, and recovers compressed audio packets and compressed audio-video packets from IP packets received from the network, and a decoder means for receiving compressed audio packets and compressed audio-video packets from the network interface means and generating a baseband video signal and multiple baseband audio signals.

In accordance with a second aspect of the invention there is provided video conferencing apparatus for connection to an IGMP network, said apparatus comprising a controlling terminal and at least first and second controlled terminals, wherein each terminal includes an encoder means that receives a baseband audio signal and a baseband video signal and creates compressed audio packets and compressed audio-video packets, a network interface means that receives the compressed audio packets and the compressed audio-video packets from the encoder means, IP encapsulates the compressed audio packets and the compressed audio-video packets, transmits the IP packets onto the network, requests audio packets from the network, receives IP packets from the network, and recovers compressed audio packets from the IP packets received from the network, and a decoder means for receiving compressed audio packets from the network interface means and generating multiple baseband audio signals, and wherein each controlled terminal is configured to request audio-video packets from the controlling terminal and to request audio packets from each of the other controlled terminal.

In accordance with a third aspect of the invention there is provided a method of conducting a video conference involving at least first, second and third conference sites connected to a network, the method comprising (a) at the first site, acquiring an audio signal and a video signal and generating IP encapsulated audio packets and audio-video packets, (b) at the second site, acquiring an audio signal and a video signal and generating IP encapsulated audio-video packets, (c) at the third site, acquiring an audio signal and generating IP encapsulated audio packets, (d) at the first site, receiving audio-video packets from the second site and generating a second site audio signal and a second site video signal therefrom, displaying a video image based on the second site video signal, receiving audio packets from the third site and generating a third site audio signal therefrom, and combining the second site audio signal and the third site audio signal to generate a first site audio mix signal, (e) at the second site, receiving audio packets from the first site and generating a first site audio signal therefrom, receiving audio packets from the third site and generating a third site audio signal therefrom, and combining the first site audio signal and the third site audio signal to generate a second site audio mix signal, and (f) at the third site, receiving audio packets from the first site and generating a first site audio signal therefrom, receiving audio-video packets from the second site and generating a second site audio signal and a second site video signal therefrom, displaying a video image based on the second site video signal, and combining the first site audio signal and the second site audio signal to generate a third site audio mix signal.

In accordance with a fourth aspect of the invention there is provided a video conference system comprising an IGMP network, a controlling terminal and at least first and second controlled terminals connected to the network, each terminal being connected to the network and comprising an acquisition means that acquires an audio signal and a video signal and generates IP encapsulated audio packets and IP encapsulated audio-video packets, and a means for requesting audio packets from each of the other terminals and recovering baseband audio signals from the audio packets, and wherein the first controlled terminal comprises a means for requesting audio-video packets from the controlling terminal and for recovering a controlling terminal audio signal and a controlling terminal video signal from the audio-video packets, and a means for combining the controlling terminal audio signal with an audio signal recovered from the audio packets received from the second controlled terminal.

In accordance with a fifth aspect of the invention there is provided a method of conducting a video conference involving at least first, second and third conference sites connected to an IGMP network, the method comprising, at each site acquiring an audio signal and a video signal and generating IP encapsulated audio packets and IP encapsulated audio-video packets, and further comprising, at the first site requesting audio-video packets from the second site, receiving audio-video packets from the second site, generating a second site audio signal and a second site video signal therefrom, and displaying a video image based on the second site video signal, receiving audio packets from the third site and generating a third site audio signal therefrom, and combining the second site audio signal and the third site audio signal and generating a first site audio mix signal, and at the second site receiving audio packets from the first site and generating a first site audio signal therefrom, receiving audio packets from the third site and generating a third site audio signal therefrom, and combining the first site audio signal and the third site audio signal and generating a second site audio mix signal, and at the third site receiving audio packets from the first site and generating a first site audio signal therefrom, requesting audio-video packets from the second site, receiving audio-video packets from the second site, generating a second site audio signal and a second site video signal therefrom, and displaying a video image based on the second site video signal, and combining the first site audio signal and the second site audio signal and generating a third site audio mix signal.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 4:
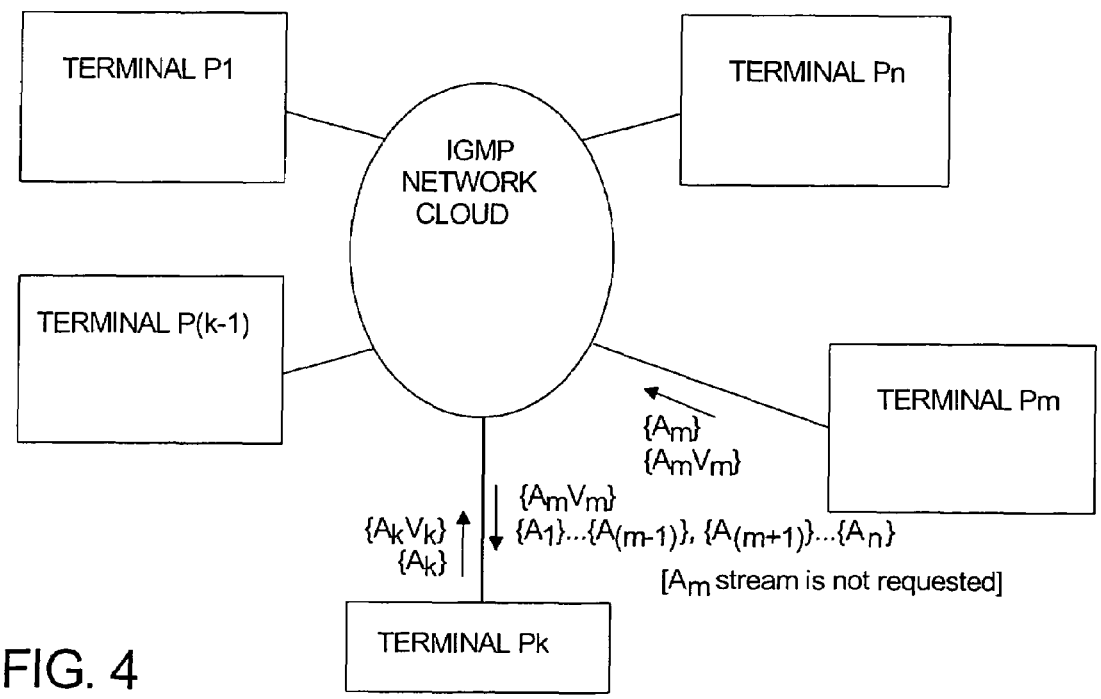
FIG. 4 is a block diagram of a video conference architecture embodying the present invention.

FIG. 4 illustrates schematically a video conference architecture in which n conference sites provided with respective A/V terminals P1 . . . Pn are connected to an IGMP (Internet Group Management Protocol) network cloud. The IGMP specifies a mode of operation of a IP network under which one terminal in a group connected to the network requests IP packets from another terminal in the group and the latter terminal places the packets on the network and the network routes the packets to the requesting terminal based on address information included in the packets. The terminals Pi (i=1 . . .

n) are of identical topology. In operation, one of the terminals operates as a controlling terminal and all the other terminals operate as controlled terminals. For the purpose of the following description, the terminal Pk is a controlled terminal and the terminal Pm is the controlling terminal. In discussing the topology or function of the terminal Pk as a controlled terminal, the components of the terminal are specified by reference characters including a suffix k, e.g. the speaker 12k, and similarly in discussing the topology or function of the terminal Pm as the controlling terminal, the components of the terminal are specified by reference characters including a suffix m, e.g. the speaker 12m, but when discussing a terminal generally, without regard to whether it is the controlling terminal or a controlled terminal, the components are specified without use of a suffix.

Figure 5:
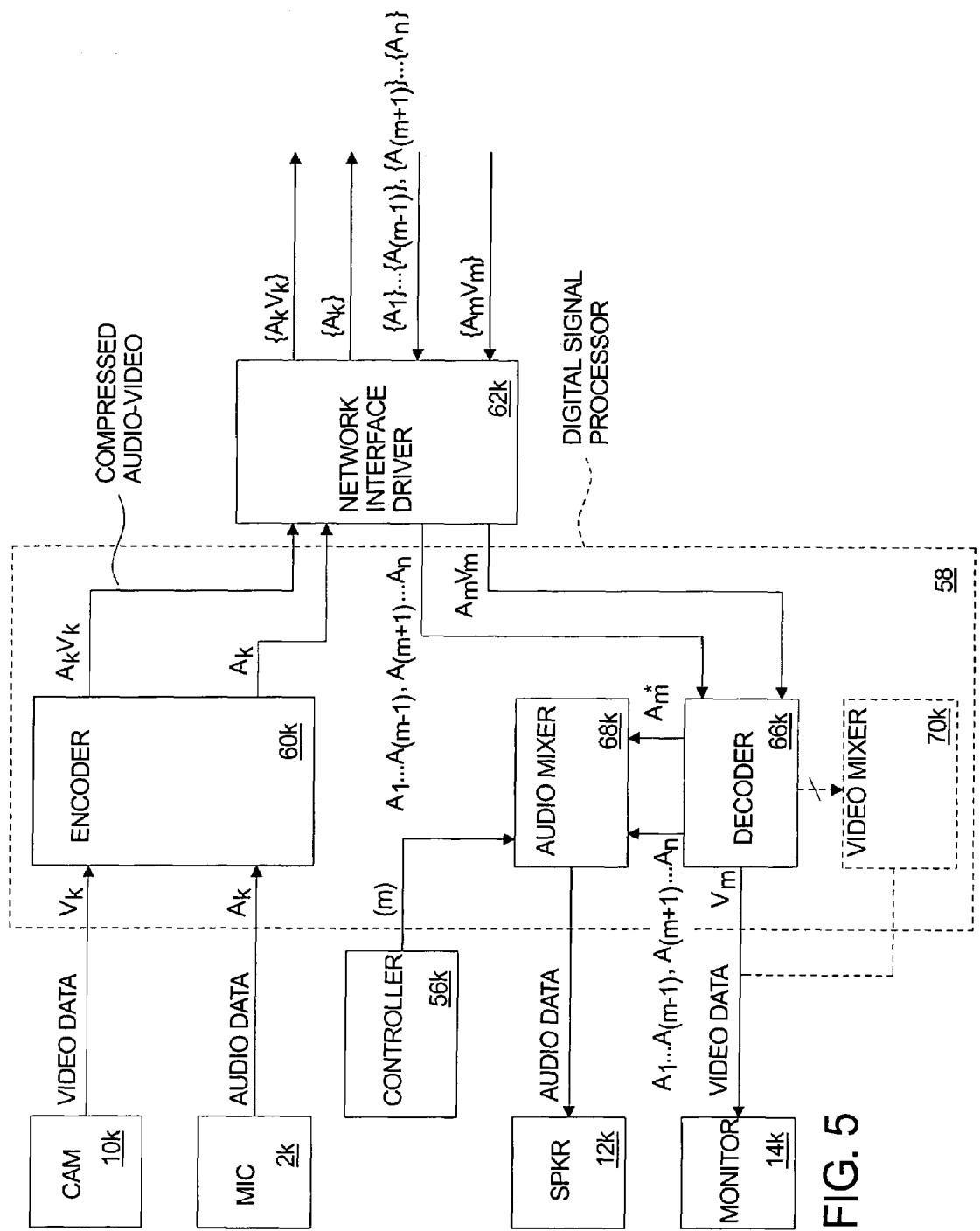
FIG. 5 is a block schematic diagram illustrating a video conference terminal embodying the present invention operating as a controlled terminal.

Referring to FIG. 5, each terminal includes a controller 56 that receives information indicating which of the terminals is the controlling terminal. The manner in which a terminal is designated as the controlling terminal, such that each other terminal is a controlled terminal, is not relevant to the invention as broadly conceived; suffice to say that the determination may be made automatically, depending on, for example, relative audio level, or it may be made by a conference participant, e.g. the instructor in a distance learning application.

Each conference terminal P includes a general purpose digital signal processor (DSP) 58 that is programmed in conventional fashion in order to implement an encoder 60, a decoder 66 and an audio mixer 68.

The encoder 60 receives the digitized audio and video signals from the microphone 2 and camera 10 respectively and compresses the audio and video data and creates a standard MPEG transport stream AV in which the payload is both audio data and video data. The encoder also creates an MPEG transport stream A in which the payload is only audio data. The encoder 60 supplies the two MPEG transport streams to a network interface driver 62. As in the case of FIGS. 1-3, the network interface driver 62 creates AV IP packets {AV}. The network interface driver also creates IP packets {A} containing only the MTS packets of the transport stream A. The latter IP packets are referred to herein as audio IP packets. The network interface driver 62 transmits the IP packets onto the network.

Based on the designation of the terminal Pm (FIG. 4) as the controlling terminal, the controlled terminal Pk (FIG. 5) requests AV IP packets from the controlling terminal Pm. The network interface driver 62m may generate audio IP packets $\{A_m\}$ but the controlled terminal Pk does not require, and therefore does not request, audio IP packets from the controlling terminal Pm. The network routes the AV IP packets $\{A_m V_m\}$ transmitted onto the network by the terminal Pm to the requesting terminal Pk. The network interface driver 62k receives the AV IP packets $\{A_m V_m\}$ and converts the AV IP packets into the corresponding MPEG transport stream $A_m V_m$, and the decoder 66k decompresses the audio and video data and generates baseband video data $V_m$ and baseband audio data $A_m^*$, where the asterisk denotes that the audio data was extracted from the MPEG transport stream $A_m V_m$, not from the MPEG transport stream $A_m$. The decoder 66k supplies the video data $V_m$ to the monitor 14k for displaying the picture acquired by the camera at the terminal Pm. The decoder 66k supplies the baseband audio data $A_m^*$ to the audio mixer 68k.

The controlled terminal Pk requests audio IP packets from all the other terminals except the controlling terminal Pm, i.e. the terminals P1 ... P(k−1), P(k+1) ... P(m−1), P(m+1) ... Pn, and the network routes the audio IP packets to the terminal Pk. The network interface driver 62k receives the audio IP packets $\{A_1\} \ldots \{A_{(k-1)}\}, \{A_{(k+1)}\} \ldots \{A_{(m-1)}\}, \{A_{(m+1)}\} \ldots \{A_n\}$ and converts the audio IP packets to the corresponding MPEG transport streams and supplies the transport streams to the decoder 66k. The decoder 66k decodes the audio MTS packets and produces multiple baseband audio data streams $A_1 \ldots A_{(k-1)}, A_{(k+1)} \ldots A_{(m-1)}, A_{(m+1)} \ldots A_n$.

The audio mixer 68k receives the baseband audio data streams $A_1 \ldots A_{(k-1)}, A_{(k+1)} \ldots A_{(m-1)}, A_{(m+1)} \ldots A_n$ from the decoder 66k and combines these input baseband audio data streams with the stream $A_m^*$ to provide a mix-minus audio signal for the terminal Pk. The mix-minus audio signal is played back through the speaker 12k. Since the mix-minus audio signal is created without subtracting the audio data stream $A_k$ from a common mix signal, playback of the mix-minus signal created by the mixer 68k produces a more natural sound than that created by the MCU in the conventional video conference architecture.

The controlling terminal Pm is of identical topology to the controlled terminal Pk and operates in similar fashion to the controlled terminal except that it does not request AV IP packets from the network. The controlling terminal Pm requests audio IP packets from the controlled terminals P1 ... P(m−1), P(m+1) ... Pn and the network interface driver 62m receives the audio IP packets $\{A_1\} \ldots \{A_{(m-1)}\}, \{A_{(m+1)}\} \ldots \{A_n\}$ from the network and supplies the corresponding audio MTS packets $A_1 \ldots A_{(m-1)}, A_{(m+1)} \ldots A_n$ to the decoder 66m. The decoder 66m decodes the audio MTS packets and provides the baseband audio data streams $A_1 \ldots A_{(m-1)}, A_{(m+1)} \ldots A_n$ to the audio mixer 68m, which generates an audio mix signal which it supplies to the speaker 12m.

It will be appreciated from the foregoing description that the video conference architecture shown in FIG. 4 does not require use of an MCU or other network resource that is dedicated to support of video conferencing as opposed to other network functions. Accordingly, the video conference system described with reference to FIGS. 4 and 5 requires only one encoder and one decoder for each conference site.

Local echo cancellation is inherent in the operation of the conference terminal, since the audio data streams that are supplied to the audio mixer 68 do not include the local audio stream A.

The monitor 14k shows the picture acquired by the camera 10m at the controlling site. Since the audio and video signals produced by the microphone 2m and camera 10m are compressed at the controlling site to create the audio-video MPEG transport stream $A_m V_m$, and the audio-video MPEG transport stream is delivered to the controlled site Pk without any intermediate decoding and encoding, the audio data stream $A_m^*$ is synchronized with the video data stream $V_m$ at the controlled site.

Figure 1:
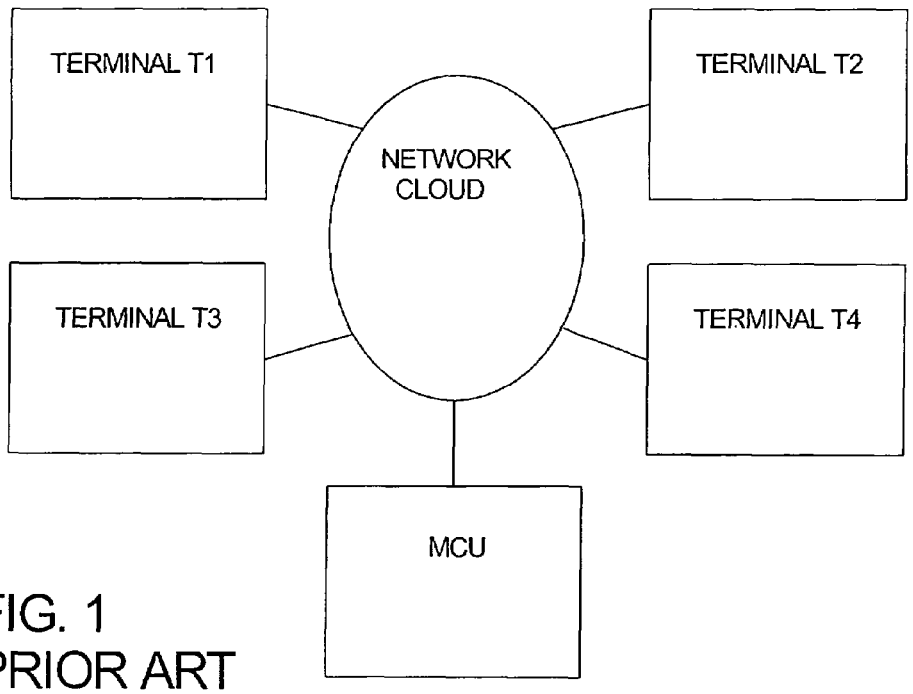
FIG. 1 is a schematic illustration of a video conferencing architecture of conventional form.
Figure 2:
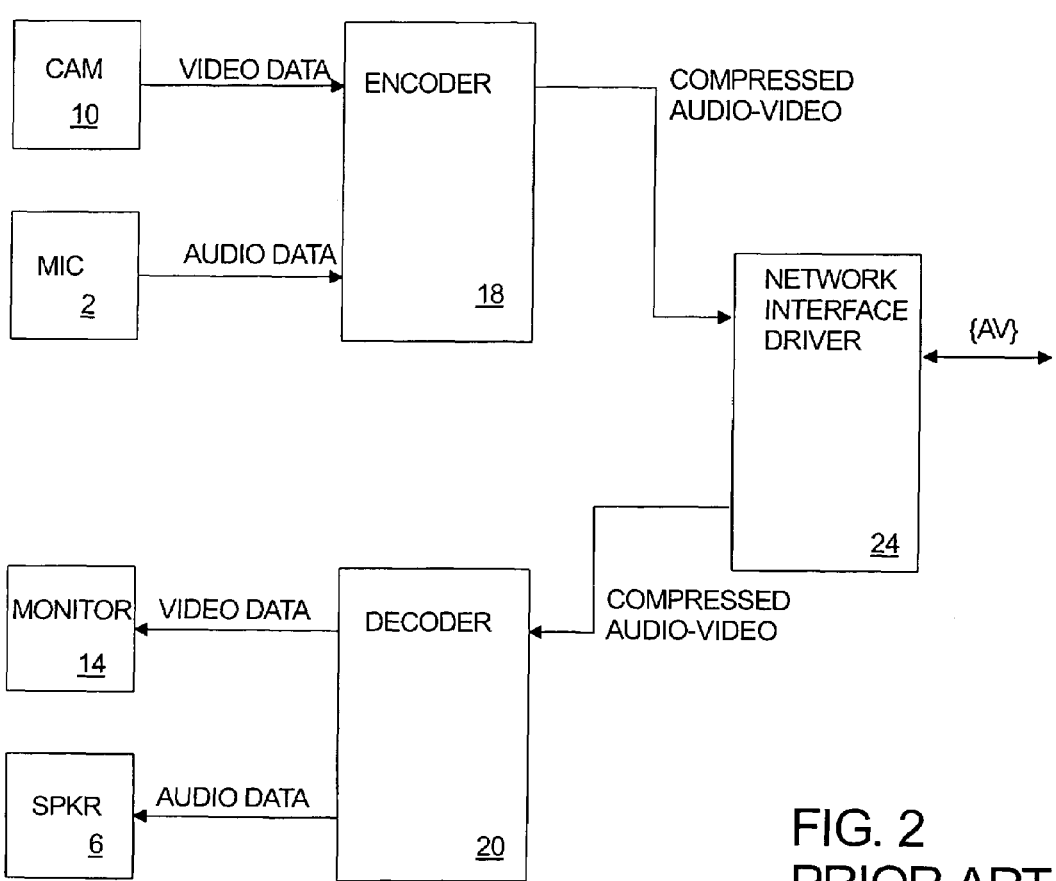
FIG. 2 is a block schematic diagram illustrating a typical video conference terminal.
Figure 3:
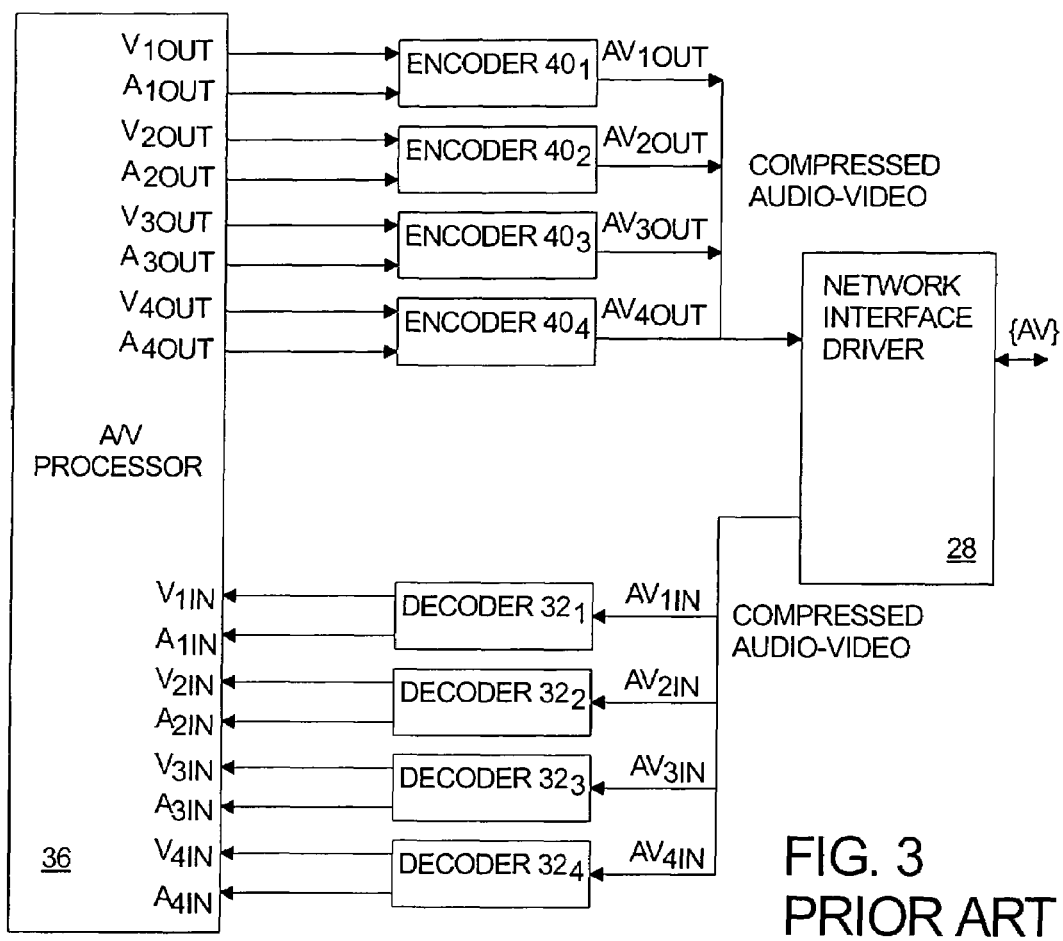
FIG. 3 is a block schematic diagram illustrating a conventional multi-point control unit.

The video conference architecture described with reference to FIGS. 4 and 5 has numerous advantages over the architecture described with reference to FIGS. 1-3. For example, since the video conferencing architecture shown in FIGS. 4 and 5 does not require an MCU, it is implicit that there is no need to generate multiple different audio streams for the respective conference sites. Each controlled terminal receives both AV IP packets from the controlling terminal and audio IP packets from all the other controlled terminals, and therefore the bandwidth requirement at the controlled terminal is higher than if it received only AV IP packets from the MCU, but the additional bandwidth requirement is in fact quite small.

The video conference architecture described with reference to FIGS. 4 and 5 does not rely on network resident resources, such as an MCU, and supports conferences of essentially arbitrary size (e.g. 20 or more participants). The architecture supports a site that does not provide AV IP packets (an audio-only site) although it might be desirable to take steps to prevent the audio-only site from being designated the controlling site.

As noted previously, the terminals described with reference to FIGS. 4 and 5 may select the controlling site based on audio level comparison. It will be appreciated that in this event it might be necessary to include a mechanism to resolve conflicts among the various terminals. For example, instead of having each site determine and designate a change in the controlling site, that authority might be given exclusively to the current controlling site.

Use of a DSP to implement the encoder, decoder and audio mixer is advantageous because suitable DSPs are commercially available and can be programmed in conventional fashion to perform the necessary functions. Further, the programming of the DSP may be changed so that the DSP will perform different or additional functions should the need arise. For example, the DSP may compare signal levels from the different sites and designate the controlling site based on relative signal levels.

The foregoing description is based on the assumption that each controlled terminal requests AV IP packets from the controlling terminal Pm only. If, as shown in dashed lines in FIG. 5, the controlled terminal Pk also included a video mixer 70k, which could be implemented by the DSP 58k, it might be desirable for the terminal Pk to request AV IP packets from one or more of the other terminals, such as the terminal Pa. In this case, the decoder 66k decompresses the transport stream $A_a V_a$ and generates the baseband video data $V_a$ and the baseband audio data $A_a^*$. The decoder 66k supplies the baseband video data to the video mixer 70k, and the video mixer combines the baseband video data provided by the terminals Pa and Pm to provide a video signal that represents a combination of the images acquired by the cameras at the terminals Pa and Pm. In this case, the terminal Pk does not request the audio IP packets provided by the terminal Pa, and the audio signal derived from the baseband audio data $A_a^*$ is synchronized with the video signal derived from the baseband video data $V_a$.

The manner in which functions have been allocated among the blocks shown in FIG. 5 has been selected for convenience in describing the operation of the terminals and is at least somewhat arbitrary, and in a practical implementation of the invention a different allocation might be preferred.

FIG. 5 shows the DSP 58 as if it were physically partitioned into discrete functional blocks, but it will be understood that this is for convenience in illustrating and explaining signal flow. Further, it will be understood that the encoder, decoder and audio mixer are implemented in a single DSP for convenience and that they might in fact be implemented in discrete devices and that one or more of the functional blocks may be implemented in software. For example, a suitable decoder for decoding both the audio-video MTS packets and the audio-only MTS packets may be readily implemented in software.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A method of conducting a video conference involving at least first, second and third conference sites connected to a network, the method comprising:
    (a) at the first site, acquiring an audio signal and a video signal and generating IP encapsulated audio packets and audio-video packets,
    (b) at the second site, acquiring an audio signal and a video signal and generating IP encapsulated audio-video packets,
    (c) at the third site, acquiring an audio signal and generating IP encapsulated audio packets,
    (d) at the first site, receiving audio-video packets from the second site and generating a second site audio signal and a second site video signal therefrom, displaying a video image based on the second site video signal, receiving audio packets from the third site and generating a third site audio signal therefrom, and combining the second site audio signal and the third site audio signal to generate a first site audio mix signal,
    (e) at the second site, receiving audio packets from the first site and generating a first site audio signal therefrom, receiving audio packets from the third site and generating a third site audio signal therefrom, and combining the first site audio signal and the third site audio signal to generate a second site audio mix signal, and
    (f) at the third site, receiving audio packets from the first site and generating a first site audio signal therefrom, receiving audio-video packets from the second site and generating a second site audio signal and a second site video signal therefrom, displaying a video image based on the second site video signal, and combining the first site audio signal and the second site audio signal to generate a third site audio mix signal.

2. A method according to claim 1, wherein step (d) comprises requesting audio-video packets from the second site and requesting audio packets from the third site, step (e) comprises requesting audio packets from the first and third sites, and step (f) comprises requesting audio-video packets from the second site and requesting audio packets from the first site.

3. A method of conducting a video conference involving at least first, second and third conference sites connected to an IGMP network, the method comprising, at each site:
    acquiring an audio signal and a video signal and generating IP encapsulated audio packets and IP encapsulated audio-video packets,
    and further comprising, at the first site:
        requesting audio-video packets from the second site,
        receiving audio-video packets from the second site, generating a second site audio signal and a second site video signal therefrom, and displaying a video image based on the second site video signal,
        receiving audio packets from the third site and generating a third site audio signal therefrom, and
        combining the second site audio signal and the third site audio signal and generating a first site audio mix signal, and at the second site:
        receiving audio packets from the first site and generating a first site audio signal therefrom,
        receiving audio packets from the third site and generating a third site audio signal therefrom, and
        combining the first site audio signal and the third site audio signal and generating a second site audio mix signal, and at the third site:
receiving audio packets from the first site and generating a first site audio signal therefrom,
requesting audio-video packets from the second site,
receiving audio-video packets from the second site, generating a second site audio signal and a second site video signal therefrom, and displaying a video image based on the second site video signal, and
combining the first site audio signal and the second site audio signal and generating a third site audio mix signal.

* * * * *